US006870935B2

(12) United States Patent
Vilkinofsky et al.

(10) Patent No.: US 6,870,935 B2

(45) Date of Patent: Mar. 22, 2005

(54) VOLUME STABILITY CONTROL FOR PARTITIONED AUDIO SYSTEM

(75) Inventors: John Vilkinofsky, Dublin, OH (US); Hiroshi Kawagishi, Powell, OH (US); Aaron Ambrose, Columbus, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 865 days.

(21) Appl. No.: 09/811,157

(22) Filed: Mar. 16, 2001

(65) Prior Publication Data

US 2002/0131605 A1 Sep. 19, 2002

(51) Int. Cl.[7] .................................................. H04B 1/00

(52) U.S. Cl. .......................... 381/86; 381/302; 381/107

(58) Field of Search .......................... 381/86, 302, 104, 381/107

(56) References Cited

U.S. PATENT DOCUMENTS 5,661,811 A * 8/1997 Huemann et al. ............. 381/86

6,330,337 B1 * 12/2001 Nicholson et al. ............ 381/86

* cited by examiner

*Primary Examiner*—Stella Woo

(74) *Attorney, Agent, or Firm*—Rankin, Hill, Porter & Clark LLP; Mark E. Duell

(57) ABSTRACT

A partitioned audio system for an automobile having front speakers and rear speakers wherein a transition phase is provided when the system is switched between single source and dual source modes. When switching from single source mode to dual source mode, the front speaker output gradually increases while the rear speaker output gradually decreases. Similarly, when switching from dual source mode to single source mode, the rear speaker output gradually increases while the front speaker output gradually decreases. In either case, the sound pressure level after switching modes is generally identical to the sound pressure level prior to switching modes.

18 Claims, 1 Drawing Sheet

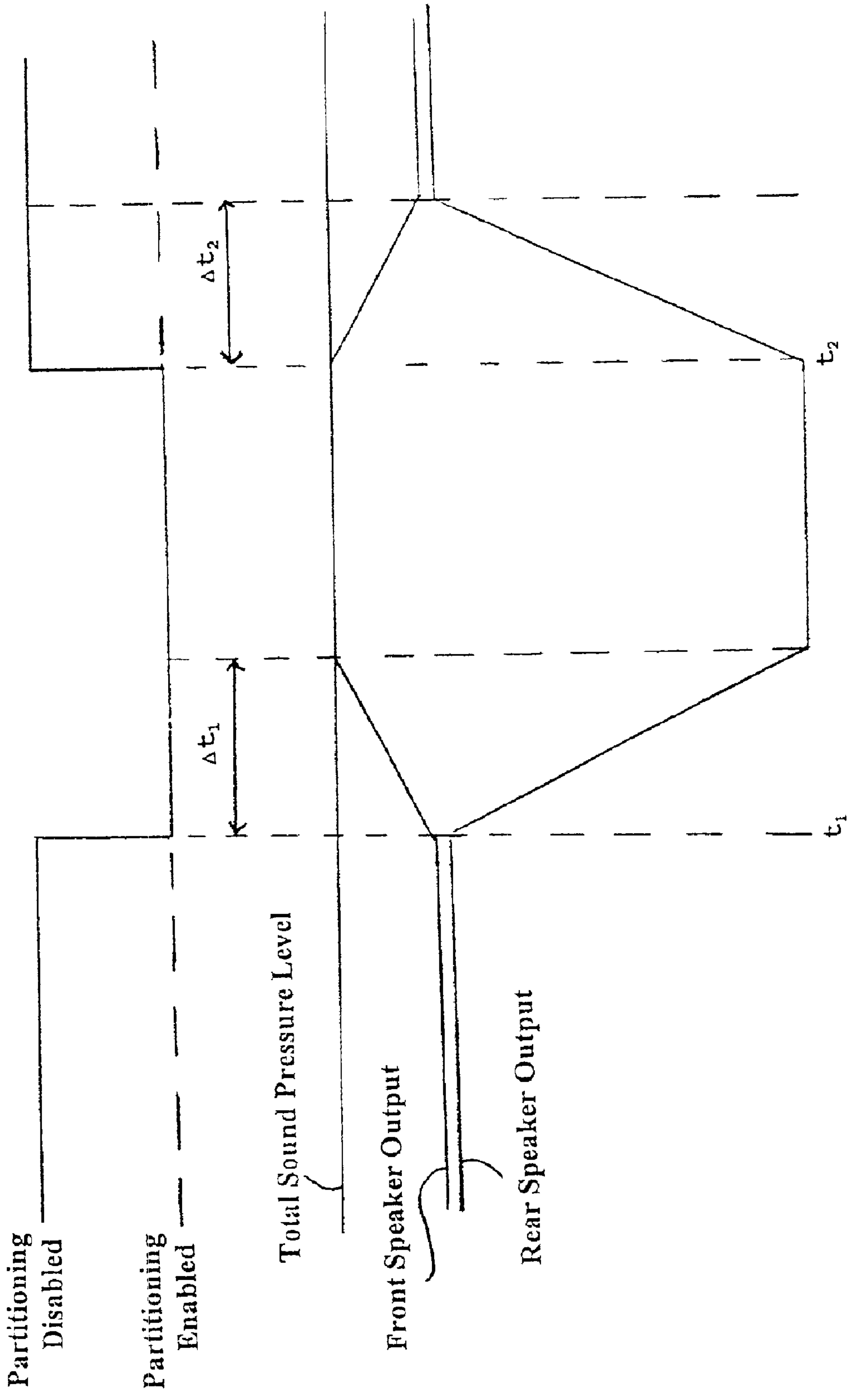
Partitioning Disabled
Partitioning Enabled
Total Sound Pressure Level
Front Speaker Output
Rear Speaker Output
$\Delta t_2$
$\Delta t_1$
$t_2$
$t_1$

VOLUME STABILITY CONTROL FOR PARTITIONED AUDIO SYSTEM

BACKGROUND OF THE INVENTION

1. Field of the Invention

The present invention is generally directed toward automobile audio systems and, more particularly, toward partitioned audio systems wherein front passengers and rear passengers listen to different audio sources.

2. Description of the Related Art

Most of the time in automobiles, all of the passengers listen to the same audio source (radio/tape/CD) whereby sounds are emitted to the passenger compartment from the front and rear speakers. However, there are times when the rear passengers cannot agree with the front passengers on the desired music or radio station to be listened to. In these situations, it is desirable to have a partitioned system wherein the front passengers listen to one source via the front speakers while the rear passengers listen to a different source by means of headphones or other personal sound sources.

Such partitioned systems are generally well known in the art. When the system is operated in the single-source mode (i.e., partitioning disabled), the front and rear speaker output is entirely controlled by the conventional controls positioned on or near the front dashboard of the automobile. In this situation, the front passengers have total control over speaker output, the portion of the overall sound attributed to the front speakers and to the rear speakers, and the total overall sound level. When the system is operated in the dual source mode (i.e., when sound partitioning is enabled), adjustment of the dashboard mounted controls by the front seat passengers is only operable to adjust the volume of the front speakers, the rear speakers being turned off. Rear-seat accessible controls are used by the rear passengers to adjust the audio source and volume output by the headphones.

Unfortunately, when the system is disabled/enabled to switch between single source and dual source modes, volume stability problems arise. For example, when switching from a single source to dual sources, the volume perceived by the front passengers drops considerably. Conversely, when switching from dual source to single source modes, the volume perceived by the front passengers increases significantly. This disadvantage with state of the art systems is aggravating and causes the front seat passengers to have to adjust the volume controls each time the mode of operation is changed.

Therefore, there exists a need in the art for a partitioned audio system that maintains the volume, as perceived by the front-seat passengers, at a stable level when the system is switched between single and dual source modes.

SUMMARY OF THE INVENTION

The present invention is directed toward an improved partitioned audio system wherein the volume, as perceived by the front passengers, is maintained at a stable level when the system is switched between dual and single source modes.

In accordance with the method of controlling the speaker output according to the present invention, when the partitioned system is switched from single source mode to dual source mode, the system enters a first transition phase wherein the output of the rear speakers decreases to zero while the output of the front speakers increases to compensate for the loss of rear speaker output. The total or overall sound pressure level in the passenger compartment, as experienced by the front passengers, remains substantially constant during the first transition phase. At the end of the first transition phase, the output of the front speakers is essentially the same as the combined output of the front and rear speakers during the single source mode or, alternatively, at some sound level that is greater than the sound level provided by the front speakers only in a conventional system.

In further accordance with the present invention, when the partitioned system is switched from dual source to single source mode, the system enters a second transition phase wherein the output of the rear speakers increases while the output of the front speakers decreases. The total or overall sound pressure level in the passenger compartment, as experienced by the front passengers, remains substantially constant during the second transition phase. At the end of the second transition phase, the combined output of the front and rear speakers, as experienced by the front passengers, is essentially the same as the output of the front speakers during the dual source mode.

BRIEF DESCRIPTION OF THE DRAWING

These and further features of the present invention will be apparent with reference to the following description and drawing FIGURE which schematically illustrates operation of the volume stability control system according to a first preferred embodiment of the present invention.

DETAILED DESCRIPTION OF THE PREFERRED EMBODIMENT

Operation of the partitioned audio control system according to the present invention will be described hereinafter with reference to the drawing figure wherein the system is shown to operate in either a first mode or a second mode. The first mode corresponds to the situation wherein audio partitioning is disabled and the overall or total sound pressure level of the passenger compartment is provided by the front and rear speakers. The second mode corresponds to the situation wherein partitioning is enabled and the sound pressure level in the passenger compartment is provided solely by the front speakers. During the second mode, the rear passengers may listen to a second source of music, etc. by means of personal sound sources such as headphones.

As used hereinafter, the sound pressure level is intended to indicate the approximate sound level within the passenger compartment and, more particularly, the sound pressure level experienced by the front passengers. Such sound pressure level may be detected by sensors or may be estimated. Moreover, the sound pressure setting of each automobile may be separately determined to tune the relative adjustments of the sound system to the specific features of the automobile. Many factors are known to contribute to the sound pressure level within the car, including the size of the passenger compartment, the relative distance between the front speakers, the rear speakers, and the area at which the sound pressure level is detected, the type of fabric used in the automobile interior, and the amount of window glass. Therefore, the individual sound characteristics of each automobile may be separately determined to tune the relative adjustments of the sound system to the specific features of the automobile.

As shown in the drawing FIGURE, the system generally is operated in the first mode, and then is switched at time $t_1$ to the second mode for an indefinite period of time. At time $t_2$ the control system is returned to the first mode of operation. The first mode corresponds to single source operation, whereas the second mode corresponds to dual source operation.

According to the present invention, time $t_1$, marks the beginning of a first transition phase wherein the outputs of the front and rear speakers gradually change. More specifically, during the first transition phase the system changes from single source to dual source operation. Accordingly, the output of the rear speakers decreases gradually toward zero while the output of the front speakers gradually increases to a level such that the total sound pressure level in the passenger compartment remains constant. The time period $\Delta t_1$, that it takes for the gradual decrease of the rear speaker output and gradual increase of the front speaker output is predetermined, and preferably is between about 1–5 seconds. Likewise, the output of the personal sound sources or headphones may also be controlled to gradually increase (from zero to a user-selected setting) as the rear speaker output gradually decreases during time period $\Delta t_1$.

Time $t_2$ marks the beginning of the second transition phase wherein the outputs of the front and rear speakers again gradually change. More specifically, during the second transition phase the system changes from dual source to single source operation. Accordingly, the output of the rear speakers increases while the output of the front speakers gradually decreases. The rate of increase of the rear speaker output and the rate of decrease of the front speaker output is such that the total sound pressure level in the passenger compartment remains constant. The second transition phase time period $\Delta t_2$ (i.e., the time that it takes for the gradual increase of the rear speaker output and gradual decrease of the front speaker output) is predetermined, and preferably is between about 1–5 seconds. Likewise, the output of the personal sound sources or headphones may also be controlled to gradually decrease (from the user-selected setting to zero) as the rear speaker output gradually increases during time period $\Delta t_2$.

Although the illustrated rate of change of the front and rear speaker output is relatively linear, it is considered apparent that the rate of change may vary during the first and second transition phases. For example, the rate of change may be relatively slower at the beginning of the transition phases and may be relatively faster at the end of the transition phases. Also, the time periods $\Delta t_1$ and $\Delta t_2$ may be identical and static, or may be adjustable, either individually or collectively, to satisfy user preferences.

It is noted that the rate of change of the front speaker output during the first and second transition phases $\Delta t_1$ and $\Delta t_2$ is not equal to the rate of change of the rear speaker output. This is due to the fact that the sound pressure level of interest is the sound pressure level at the front seat area. Accordingly, due to proximity, at the front seat area the impact of the front speaker output may be relatively greater than the impact of the rear speaker output. Hence, the front speaker output will change relatively less during the first and second transition phases while the rear speaker output will change relatively more during these transition phases.

In experiments conducted by the inventors, it was found that, assuming that the contribution of the front and rear speakers was the same at the measurement location, the front speaker output level would increase by about 3 dB to maintain the overall sound pressure level constant when the system was switched from single source mode to dual source mode. Preferably, the adjustment level will be a constant in the control software, and will be tuned or calibrated to each vehicle. For example, the adjustment level or constant will be relatively larger if the contribution of the rear speakers is relatively more than that of the front speakers. Conversely, the adjustment level or constant will be relatively smaller if the contribution of the rear speakers is relatively less than that of the front speakers.

Naturally, if the system was at a very high sound level when switched from single source to dual source, the front speakers alone may not be able to maintain the overall sound pressure level. Moreover, in most automobiles, the rear speakers contribute relatively more of the low or bass frequencies than do the front speakers. Therefore, in order to maintain relatively constant frequency components when switching from single source mode to dual source mode, the equalization of the front speakers could be adjusted. In such circumstances, particular frequency components of the front speaker output will change relatively more (or less) than other frequency components. The amount of front speaker low frequency output adjustment to maintain the overall sound quality could be a set amount, or could be variable in dependence upon many factors. Such factors include the specific vehicle tuning as well as the user settings prior to switching modes. Naturally, these adjustments would be reversed when switching from dual source mode to single source mode.

While the preferred embodiments of the present invention are shown and described herein, it is to be understood that the same is not so limited but shall cover and include any and all modifications thereof which fall within the purview of the invention as defined by the claims appended hereto.

What is claimed is:

1. A method for controlling a partitioned audio system in an automobile, said automobile having front speakers and rear speakers that communicate with a passenger compartment, a front seat and a rear seat being disposed within said passenger compartment, said method comprising the steps of:

selectively operating said partitioned audio system in one of a first mode of operation and a second mode of operation, said first mode of operation being when a single audio source is emitted from said front and rear speakers to generate a desired sound pressure level within said passenger compartment, said second mode of operation being when the first audio source is emitted from the front speakers to generate the desired sound pressure level within the passenger compartment, the rear speakers are off, and a second audio source is emitted from personal sound sources for passengers in the rear seat;

wherein, when said partitioned audio system is switched from said first mode of operation to said second mode of operation, a transition phase is entered whereby an output level of said front speakers increases while an output level of said rear speakers decreases.

2. A method for controlling a partitioned audio system according to claim 1, wherein outputs of said front and rear speakers are controlled during the transition phase such that the sound pressure level at an area adjacent the front seat is relatively constant.

3. A method for controlling a partitioned audio system according to claim 2, wherein said transition phase is a first transition phase and, when said partitioned audio system is switched from said second mode of operation to said first mode of operation, a second transition phase is entered whereby an output level of said front speakers decreases while an output level of said rear speakers increases.

4. A method for controlling a partitioned audio system according to claim 1, wherein said transition phase is a first transition phase and, when said partitioned audio system is switched from said second mode of operation to said first mode of operation, a second transition phase is entered whereby an output level of said front speakers decreases while an output level of said rear speakers increases.

5. The method for controlling a partitioned audio system according to claim 4, wherein outputs of said front and rear speakers are controlled during the first and second transition phases such that the sound pressure level at an area adjacent the front seat is relatively constant.

6. The method for controlling a partitioned audio system according to claim 5, wherein the amount said front speaker output increases during said first transition phase is predetermined.

7. The method for controlling a partitioned audio system according to claim 1, wherein the amount said front speaker output increases during said transition phase is predetermined.

8. The method for controlling a partitioned audio system according to claim 1, wherein the amount said front speaker output increases during said transition phase is tuned to characteristics of the automobile.

9. The method for controlling a partitioned audio system according to claim 1, wherein the amount said front speaker output increases during said transition phase is tuned to characteristics of the automobile.

10. The method for controlling a partitioned audio system according to claim 1, wherein, during said transition phase, particular frequency components of the front speaker output increase relatively more than other frequency components of the front speaker output.

11. A method for controlling a partitioned audio system according to claim 10, wherein outputs of said front and rear speakers are controlled during the transition phase such that the sound pressure level at an area adjacent the front seat is relatively constant.

12. A method for controlling a partitioned audio system according to claim 11, wherein said transition phase is a first transition phase and, when said partitioned audio system is switched from said second mode of operation to said first mode of operation, a second transition phase is entered whereby an output level of said front speakers decreases while an output level of said rear speakers increases.

13. The method for controlling a partitioned audio system according to claim 12, wherein, during said first transition phase, particular frequency components of the front speaker output increase relatively more than other frequency components of the front speaker output and, during said second transition phase, said particular frequency components of the front speaker output decrease relatively more than said other frequency components of the front speaker output.

14. A method for controlling a partitioned audio system according to claim 10, wherein said transition phase is a first transition phase and, when said partitioned audio system is switched from said second mode of operation to said first mode of operation, a second transition phase is entered whereby an output level of said front speakers decreases while an output level of said rear speakers increases.

15. The method for controlling a partitioned audio system according to claim 14, wherein, during said first transition phase, particular frequency components of the front speaker output increase relatively more than other frequency components of the front speaker output and, during said second transition phase, said particular frequency components of the front speaker output decrease relatively more than said other frequency components of the front speaker output.

16. The method for controlling a partitioned audio system according to claim 15, wherein the amount said particular frequency components change during said first and second transition phases is predetermined.

17. The method for controlling a partitioned audio system according to claim 15, wherein the amount said particular frequency components change during said first and second transition phases is tuned to characteristics of the automobile.

18. The method for controlling a partitioned audio system according to claim 15, wherein the amount said front speaker output changes during said first and second transition phases depends, in part, upon user-selected settings of the audio system.

* * * * *